Patented Aug. 15, 1944

2,355,813

UNITED STATES PATENT OFFICE 2,355,813

METHOD OF LOGGING

Thayer T. May, Garden City, La.

No Drawing. Application February 5, 1944,
Serial No. 521,283

8 Claims. (Cl. 214—152)

The main object of my invention is to provide a method of logging by means of which timber and cord wood can be cut and transported to a conveyance from swamp land, which in the past could not be cut and transported profitably.

Another object of my invention is to provide a floating method of logging by erecting levees around an area and flooding said area by pumping water into said area.

A further object of my invention is to provide a floating method of logging which enables trees to be cut before or after the area is flooded thereby enabling my method to be used in all kinds of swamp or semi-swamp land.

The first step of carrying out my method is to estimate by any of the well known methods the timber and pulp wood on the land to be cut; carefully noting the largest trees that will be handled as this will determine the depth of the water required for floating the logs. Next levels are run on all the boundary lines of the property and sufficient levels are run across the property at intervals to locate and ascertain the height of any ridges. The presence of ridges will of course necessitate a greater amount of water or depth of water and higher levees. After the levels are run and the required depth of water has been determined a right-of-way is cleared around the property line for erecting the levees. I usually find that I have high land around the property at some point or points where it is not necessary to construct levees, and of course in some cases the levees will be higher than in others.

After the survey has been made then I build a levee of sufficient base and height to hold the required volume of water. The base and height of the levees vary greatly of course with the depth of the water and also with the type of soil present. In cases where the timber land borders on farms or other useful land which drain through or on the timber land, the dirt for the levee is taken from the outside in such a manner as to form a free flowing ditch or canal running around the enclosed area to be flooded, thus permitting water that formerly drained across the area enclosed by the levee to flow around the enclosed area and instead of interfering with the drainage and causing damage to neighboring property it often improves the drainage to this property. This is due to the fact that the velocity and quantity of the water is greater even in a small clear ditch than across a large area where the flow is impeded by the trees, grass, scrubs, ridges and other obstructions found in all swamp and wooded areas. Where drainage of the neighboring land is not involved the ditch made in building the levee is preferably placed on the inside of the levee as it has an advantage, as it can be used as a passageway in the floating operation of the logs cut in the area enclosed by the levee.

The timber, cord wood and pulp wood to be removed from the enclosed area if of a species that does not float readily is deadened from one to six months before the floating operation begins and is then felled and topped just before or after the water is pumped into the land. Where the growth is heavy and the trees stand close together when it is possible I usually fell part of it before putting water on the land and the rest after removing the trees first felled to avoid congestion and having trees lying on top of each other, which slows the floating operation and increases the cost.

I cut all timber possible without causing congestion before putting water on the land as the men can work to better advantage on dry land than on wet land, and this is one of the principal advantages of my invention over the natural flotation process, as I am able to put a cutting crew into a semi-swamp area and cut the trees and form the necessary float-roads before the area is flooded without running the risk of losing the timber due to the fact that the water does not raise as often happens when timber is cut ahead in anticipation of a natural rain-water float, or a float depending on back-water from a nearby river or stream.

Float-roads about six to eight feet wide are cut and cleared through the land at intervals from 100 to 1,000 feet, depending upon the density of the underbrush, quantity and size of the timber to be removed, and the distance to be covered from the most remote point of the area to the point or points of distribution where the timber will be lifted or skidded over the levees.

In order to prevent the levees from being injured and to maintain the water at a predetermined level under all weather conditions I provide the levee with one or more adjustable spillways or flood gates so that in the event of heavy rains the water level will not rise high enough to spill over the levee and start cutting it away. Of course this is not always necessary but I have found that it is a great advantage in some cases and by having a spillway it is easy to maintain the water at a predetermined level.

At any one of the points of destination of the logs where I handle or transfer the trees over the levee I clear out all underbrush covering an area of an acre or two in order to have a place to hold the logs in the event the floating crews get ahead of the machines lifting the logs over the levees.

By my method I can at all times control the depth of the water in the woods to be cut as I pump enough water to float the smaller timber and then raise the water level as I finish floating the smaller timber and start handling the larger timber. This ability to maintain exactly the depth of the water needed at all times during the floating process is a material advantage as men can accomplish more if the water is no deeper than is necessary to float the particular trees they are handling. In other words, if it is going to require 42 inches of water to float the largest timber on the tract I will probably be able to start floating the smaller timber when the water reaches a depth of 20 inches and I then gradually raise the water level as the size of the timber being handled increases, whereby I am able to profitably cut tracts of timber which contain trees varying in size.

After the necessary roads have been formed and the trees conditioned to be handled I then pump onto the land a sufficient amount of water until the required depth is reached. The floating crew now leads each tree along into the previously prepared float-roads and down those float-roads to a point in the levee where the tree or log is lifted or skidded over the levee and placed on barges, railroad cars, trucks, rafts, or in or on whatever means of conveyance is to be used from this point to the mill which is to handle the logs.

In the area which I am operating I nearly always have a small bayou, canal or stream adjacent to the previously formed levee but if not a small ditch is dug from the nearest stream to the levee and at this point I place a high volume low lifting pump with a capacity of from 5,000 to 100,000 gallons per minute, depending upon the area to be flooded and the depth of water required to float the timber or logs therein. This pump is driven by a Diesel engine, electric engine, or any other low-cost power source, and as the lift is never in excess of five feet enormous quantities of water can be pumped with a a very low power consumption, and of course it is necessary to pump at intervals to maintain the water at all times at a predetermined depth within the area so that there will be sufficient water to float the logs.

I have found in practice that after the water reaches the required level within the area confined by the leeves it is only necessary to run the pump for a few hours every day or so to replenish the water lost by seepage or evaporation. I have also found that the levee construction usually requires from one-half yard to three or four yards of dirt per foot of levee and the depth of water ranges from one to five feet, but in most cases a depth of from two to three and one-half feet is sufficient to float the logs in areas upon which my method has been used successfully.

This method of logging is being employed on land which cannot be logged with mules, men or tractors as the ground is usually covered with from one to twelve inches of water and is so soft that a man walking in it often sinks up to his waist, thereby making it impossible to profitably cut and transfer the logs to a mill. This method of pumping and floating is enabling me to operate lands that I could not consider before as the cost of skidding is prohibitive, and where land can be operated by natural floating only in certain seasons I have found that it can not be operated profitably to get enough timber to operate a mill the year around, in view of the scarcity of labor and the damaging and deterioration which will take place in the timber before it is sawn if too much timber is logged at one time. Also a mill dependent on natural floating has a very uncertain life as some years no natural floats occur.

In the south there are millions of acres of land on which are located millions of cords of wood suitable for pulping but this has never been utilized as there was no known method of getting this cord wood out at a price that could compete with the cost of getting pulp wood on lands that were dry enough to permit the use of wagons, trucks and railroads. By using an artificial floating process all of the advantages of a natural process or method of logging are obtained and in many instances other advantages are obtained as I am able to cut timber in a semi-marsh or swamp land and then flood the land and float the timber therefrom.

From the foregoing description it will be seen that I have provided a novel method of pumping water into an area confined by a levee arranged around the perimeter of said area, and maintaining the water in said area at a predetermined level which may be raised or lowered, which enables the logs and cord-wood to be removed from a flooded area at a very low cost.

While various methods can be used without departing from the spirit of my invention I generally form a levee around the area to be cut, then form collecting areas and float roads in said area. The area confined by the levee is then flooded to a depth sufficient to float small sized timber which is transported along a float area to the collecting area and after the small sized timber has been cut the larger timber is cut and the depth of water is sufficiently increased within the area to float the larger sized trees so that they can be transported along the float roads to the collecting areas.

I claim:

1. The method of logging consisting in, first determining the depth of the water required by the size of the trees and the height of the ridges in the area to be cut, second, clearing a right-of-way around the perimeter of said area, third, forming a levee along said right-of-way to a height and width determined by the volume of water to be maintained in said area, fourth, forming log float-roads in said area to a predetermined point of destination, fifth, cutting the trees in said area, sixth, pumping water into said area until a predetermined level of water is reached in said area and intermittently pumping water into said area to maintain said water at a predetermined level, seventh, floating the logs in said float-roads to points of destination and eighth, removing logs over the levees onto a conveyance.

2. The method of logging consisting in, first determining the depth of water required to float logs in a certain area, second, forming float-roadways in said area, third, forming a levee around the perimeter of said area, and fourth, pumping water into said area and maintaining water therein at a predetermined level and then transferring the logs to a point of destination along the roadways formed.

3. The method of logging consisting in, first determining the depth of the water required in a certain area for floating logs, second, clearing a right-of-way around said area, third, forming a levee along the right-of-way, fourth, forming log float-roads in said area to a point of destination, fifth, cutting the trees in said area, sixth, pumping water into said area and maintaining water in said area at a predetermined depth and seventh, transferring logs along said float-roads to predetermined points of destination.

4. The method of logging consisting in, forming a levee along the perimeter of an area to be cut to a height and width to resist the pressure of the volume of water to be maintained in said area, cutting trees in said area, pumping water into said area until a predetermined depth is reached and maintained and floating the logs in said area to a predetermined point along said levee.

5. The method of logging consisting in, forming a levee along the perimeter of the area to be cut, pumping water into said area until a predetermined depth is reached and maintained, cutting the trees in said area and floating the logs to a predetermined point along said levee.

6. The method of logging consisting in, forming a levee along the perimeter of the area to be cut to a predetermined height, cutting the trees in said area, forming float-roads in said area to a point of destination, pumping water into said area until a predetermined depth is reached and maintained and floating the logs in said float-road to a point of destination along said levee.

7. The method of logging consisting in forming a levee along the perimeter of the area to be cut to provide a retaining wall for the water within said area and a free unobstructed free-flowing draining ditch along the outside of said levee, cutting the timber within said area, forming float-roads in said area, pumping water into said area and maintaining water at a predetermined depth therein and floating the logs in said area through said float-roads to a point of destination.

8. The method of logging consisting in forming a levee along the perimeter of the area to be cut, forming float roads and collecting areas within the area confined by the levee, flooding the area confined by the levee sufficiently to float smaller sized timber, transporting the same along the float roads to the collecting area, increasing the depth of the water sufficiently to float larger sized timber and transporting the larger sized timber along the float roads to the collecting area.

THAYER T. MAY.